(12) United States Patent
Lu et al.

(10) Patent No.: US 6,956,910 B2
(45) Date of Patent: Oct. 18, 2005

(54) FAST TRANSMITTER BASED ON TABLE LOOKUP

(75) Inventors: Jin Lu, Croton On Hudson, NY (US); Mayan Moudgill, White Plains, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 367 days.

(21) Appl. No.: 10/299,900

(22) Filed: Nov. 20, 2002

(65) Prior Publication Data

US 2004/0096011 A1 May 20, 2004

(51) Int. Cl.[7] .............................................. H04L 27/20
(52) U.S. Cl. ...................... 375/308; 375/283; 375/130
(58) Field of Search ................................ 375/130, 140, 375/146, 244, 279, 283, 295, 308; 370/335

(56) References Cited

U.S. PATENT DOCUMENTS

| | | | | |
|---|---|---|---|---|
| 4,481,640 A | | 11/1984 | Chow et al. ................ 375/143 |
| 4,706,261 A | * | 11/1987 | Torre et al. ................ 375/244 |
| 5,956,328 A | * | 9/1999 | Sato .......................... 370/335 |
| 6,061,359 A | | 5/2000 | Schilling et al. ........... 370/441 |
| 6,115,411 A | | 9/2000 | van Driest ................. 375/130 |
| 6,160,838 A | | 12/2000 | Shinohara et al. .......... 375/130 |
| 6,181,729 B1 | | 1/2001 | O'Farrell .................... 375/130 |
| 6,331,997 B1 | | 12/2001 | Li ............................... 375/130 |
| 6,452,958 B1 | | 9/2002 | van Nee .................... 375/130 |
| 2004/0086028 A1 | * | 5/2004 | Kluge et al. ................ 375/146 |

FOREIGN PATENT DOCUMENTS

GB       2 351 633 A       1/2001

OTHER PUBLICATIONS

Welborn, M. et al.: "Waveform synthesis for transmission of complex waveforms," Radio and Wireless Conference, 1999, *IEEE* Denver, CO, pp. 121–124 (Aug. 1999).

Allan R. D. et al.: "A high performance satelite data modem using real–time digital signal processing techniques," *J. IERE*, vol. 58, No. 3, pp. 117–124 (May 1988).

* cited by examiner

*Primary Examiner*—Chieh M. Fan
(74) *Attorney, Agent, or Firm*—Barnes & Thornburg; Perry Palan

(57) ABSTRACT

A method of increasing the speed of a transmitter by storing in look-up tables, modulation, spread, over-sampled and filtered samples of modulated data bits having an I and Q. The bits I and Q are differentially modulated, and the tables are indexed based on the differential modulation.

19 Claims, 4 Drawing Sheets

FAST TRANSMITTER BASED ON TABLE LOOKUP

BACKGROUND AND SUMMARY OF THE INVENTION

The present disclosure is directed generally to transmitters for data in a network and, more specifically, to an improved transmission scheme for wireless communication, for example, in a large area network (LAN).

Although the present invention will be described with respect to wireless communication and, specifically, the IEEE Standard 802.11, the principles also apply to other transmitting schemes which involve data modulation, spreading and over-sampling ETC.

IEEE Standard 802.11 (Wireless LAN Medium Access Control (MAC) and Physical Layer (PHY) specifications) is a protocol standard for wireless LAN communication. Its physical layer in the transmitter is responsible for encoding and modulating a packet into baseband signals. As illustrated in FIG. 1, for given a sequence of bits of a packet, the physical layer:

1. modulate the bits or symbols (one bit per symbol for DBPSK and 2 bits per symbol for DQPSK) with DBPSK (for 1 mbps) or DQPSK (for 2 mbps) or other modulation systems to get a sequence of (I, Q) pairs at 10;

2. spread I and Q with Barker sequence to get eleven chips for each I and Q bit at 12;

3. over-sample each chip by a factor of M, say M=4, to get a sequence of I samples and Q samples at 14;

4. feed the I and Q samples to a pulse-shape filter 16;

5. forward the filtered I and Q samples to a RF modulator 18; and 6. transmit the RF modulated I and Q samples.

Although each of the steps are necessary, they are time consuming. Combining or implementing any or more of the steps in a more efficient way will increase the transmission speed of the transmitter.

The present method performs steps 1, 2, 3 and 4 using one or more look-up tables, therefore substantially decreasing the processing time. The present invention is a method of differentially modulating, spreading, over-sampling and filtering a stream of bits forming symbols for transmission including determining an $I_i$, and a $Q_i$ for each symbol $S_i$ using differential modulation with respect to a previous symbol $S_{i-1}$ having an $I_{i-1}$ and a $Q_{i-1}$. A row of a matrix for I is indexed using two of $I_{i-1}/Q_{i-1}$, $I_i/Q_i$, and $S_i$ and providing the samples in the indexed row as a spread, over-sampled and filtered output of $I_i$. Also, a row of a matrix for Q is indexed using two of $I_{i-1}/Q_{i-1}$, $_i/Q_i$, and $S_i$ and providing the samples in the indexed row as a spread, over-sampled and filtered output of $Q_i$. These values for $I_i$ and $Q_i$ are then RF modulated and transmitted.

The determining of I and Q includes using one or more of the following differential phase shift keying (DPSK): binary phase shift keying (BPSK) and quadrature phase shift keying (QPSK). The method of determining the $I_i$, $Q_i$, uses a look-up table indexed by the previous $I_{i-1}$ $Q_{i-1}$ and the present symbol $S_i$. The method of determining $I_i$ $Q_i$ is performed in one of in series with, in parallel with and simultaneously with indexing the I and Q matrices.

The matrix has n rows equal to the number of possible combinations of values of two of the previous $I_{i-1}$, $Q_{i-1}$, the present $I_i$, $Q_i$, and the present symbol $S_i$ and m columns equal to a spread factor times an over-sample factor. Prior to performing the method, the spreading, over-sampling and filtering are determined and stored in the rows of the matrix.

The present invention is also directed to a method of transmitting a stream of data bits which form a symbol and includes determining for each symbol an I and a Q. A matrix is indexed using the I and Q to provide a spread, over-sampled and filtered output of the I and Q. This output is RF modulated and transmitted. A matrix for I and a matrix for Q are indexed using two of the present symbol $S_i$, the present $I_i$, $Q_i$ and the previous $I_{i-1}$, $Q_{i-1}$. The I and Q are determined using differential modulation of a present symbol $S_i$ with respect to the previous symbol $S_{i-1}$.

The present invention is also directed to the matrix itself having n rows equal to the possible combinations of values of $I_i$, $Q_i$, and m columns equal to the spread factor times an over-sample factor. Each row includes values corresponding to the spread, over-sampled and filtered samples I, Q. The modulated I, Q's are differentially modulated for a present $I_i$, $Q_i$ with respect to a previous $I_{i-1}$, $Q_{i-1}$, and the n rows equal to the possible combinations of values of two of the previous $I_{i-1}$, $Q_{i-1}$, the present $I_i$, $Q_i$, and the present symbol $S_i$.

These and other aspects of the present invention will become apparent from the following detailed description of the invention, when considered in conjunction with accompanying drawings.

DETAILED DESCRIPTION OF THE PREFERRED EMBODIMENTS

Figure 1:
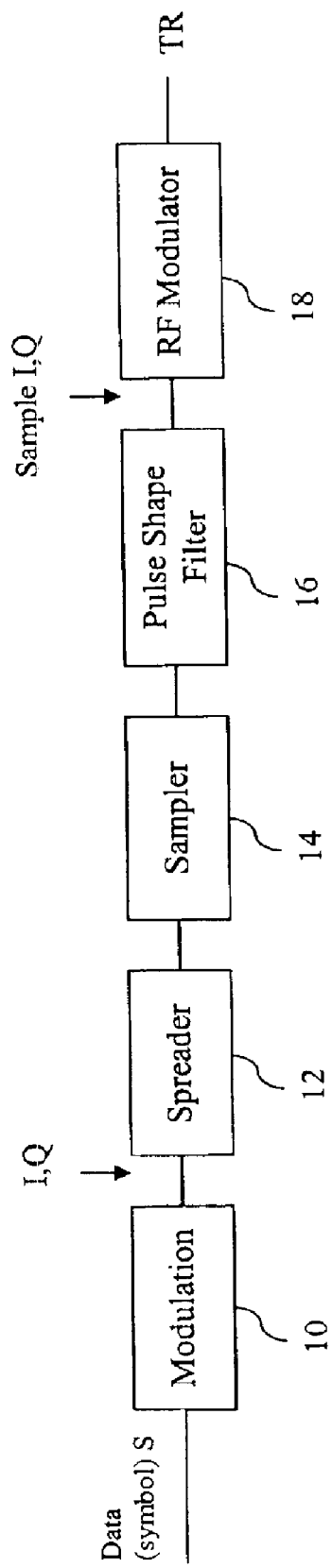
FIG. 1 is a block diagram of a transmitter of the prior art.
Figure 2:
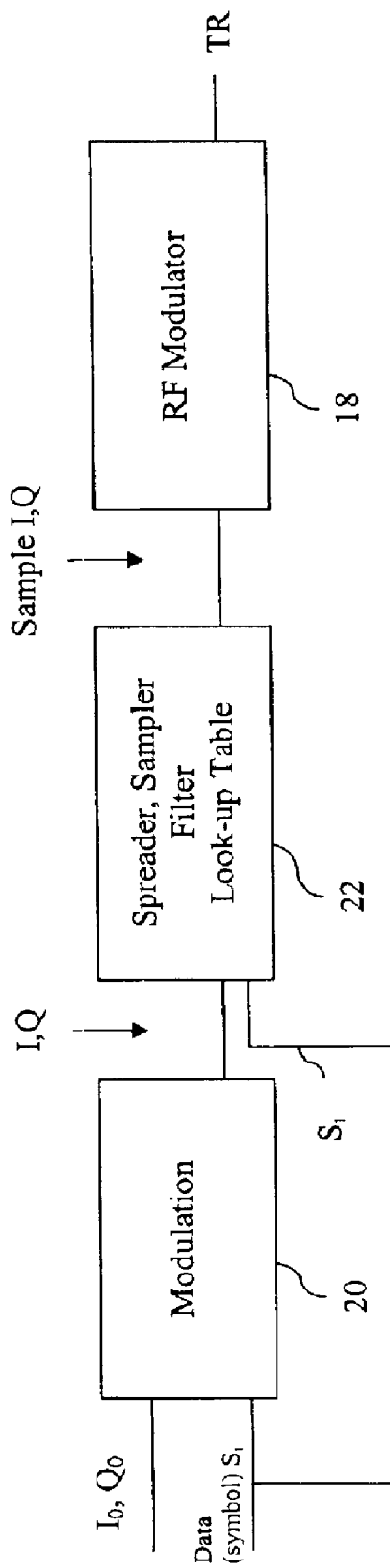
FIG. 2 is a schematic of a transmitter according to the principles of the present invention for serial processing.

This invention concerns the implementation of the spreading, over-sampling and pulse-shape filtering steps 1, 2, 3 and 4. The invented method takes advantage of the fact that the output I and Q samples are a combination of some known sample segments of size 11M (say 44 for M=4) associated with the input bit patterns. The method pre-calculates these known spread, sampled, filtered segments and puts them in a table 22, shown in FIG. 2. During data transmission, the transmitter modulates the input data bits forming symbols S at 20 into I and Q, selects the appropriate sample segments sample I,Q from the tables 22, and sends them to the RF modulator 18 and transmits. Also, the modulation of the data or symbols is know and the possible combinations are pre-calculated and stored in look-up table 20. While serial processing the modulation and spread, sampled, filtered segments is shown in FIG. 2, the two processes may be performed in parallel as show in FIG. 3 or simultaneously as show on FIG. 4.

This table-lookup based approach improves the speed of 802.11 layer transmitter significantly.

Assume a sequence of information bits, e.g. {0 1 1 0 1 1 0 0 . . . }, comes from the Medium Access Control (MAC) layer of STD 802.11. For 1 mbps case, one symbol consists of one bit, and for 2 mbps case, one symbol consists of two bits. Each symbol is mapped into a pair of I and Q, where I and Q are 1 or −1, based on the (I, Q) mapping for the previous symbol—an important feature of differential modulation (including DBPSK and DQPSK).

An example will be described using differential modulation (BPSK) in the case of 1 mbps. Look at the information bit sequence {0 1 1 0 1 1 0 0 ... }. If the first symbol 0 is mapped to (I, Q)=(1, −1), then the second symbol 1 is mapped to (I, Q)=(−1, 1) (rotated 180 degrees). If the second symbol was 0, then the mapped (I, Q) would be the same as the previous mapping, i.e. (1, −1). In short, the present symbol 1 rotates the previous (I, Q), and the present symbol 0 keeps the previous (I, Q). Table 1 illustrates the look-up table 20 for all values of I,Q:

TABLE 1

| | $S_i$ | |
|---|---|---|
| | 0 | 1 |
| $I_{i-1}, Q_{i-1}$ | 1, −1 | 1, −1 | −1, 1 |
| | −1, 1 | −1, 1 | 1, −1 |
| | 1, 1 | 1, 1 | −1, −1 |
| | −1, −1 | −1, −1 | 1, 1 |

If the two possible states are known for I,Q, Table 1 would only have two rows. For the present example, this would be the first two rows.

For QPSK, the I, Q are two bits mapped by 90 degree rotations. Table 2 illustrates the look-up table 20 for all values of I,Q:

TABLE 2

| | $S_i$ | | | |
|---|---|---|---|---|
| | 00 | 11 | 01 | 10 |
| $I_{i-1}, Q_{i-1}$ | 1, −1 | 1, −1 | −1, 1 | −1, −1 | 1, 1 |
| | −1, 1 | −1, 1 | 1, −1 | 1, 1 | −1, −1 |
| | 1, 1 | 1, 1 | −1, −1 | −1, 1 | 1, −1 |
| | −1, −1 | −1, −1 | 1, 1 | 1, −1 | −1, 1 |

It is noted that other differential modulation schemes may be used.

Based on the differential modulation principle, the receiver of the (I, Q) pairs is able to determine the original symbols or bits by comparing two consecutive (I, Q) pairs.

Thus, given a previous ($I_{i-1}$, $Q_{i-1}$) mapping, and the current symbols $S_i$, then the output of the pulse shape filter sample $I_i$, $Q_i$ corresponding to $S_i$ is known. This is because the spreading sequence, the over-sample factor, and the shape filter taps are known.

Based on the above reasoning, the output of pulse shape filter associated with all possible combinations of two consecutive I and Q after spreading, sampling and filtering is calculated. For example, two look-up tables or matrices 22, one for I and one for Q, are created. Also, a single look-up table for I and Q bits could be created with different indexing.

The I and Q look-up tables 22 each has n rows and m column, where n is the number of possible combinations of values two of $I_{i-1}/Q_{i-1}$, $I_i/Q_i$, and $S_i$, and m is the number of the output of pulse shape filter associated with one symbol, which is the spread factor times the over-sample factor (i.e. m=44 sixteen bit samples, for this example). For BPSK, the look-up table 22 for I or Q would have n=4, the row index would be two of the following:

TABLE 3

| $S_i$ | $I_i/Q_i$ | $I_{i-1}/Q_{i-1}$ |
|---|---|---|
| 0 | 1 | 1 |
| 1 | 1 | −1 |
| 0 | −1 | −1 |
| 1 | −1 | 1 |

Since the modulation is 180 degrees, both I and Q change signs for a symbol of 1, either I or Q can be the index of the look-up table 22. This is not the case for QPSK wherein the number of rows n=16. The index requires both the I and Q bits for both the I and Q look-up tables since the rotation is 90 degrees. The index would include any two of $-I_{i-1}$ $Q_{i-1}$, $I_i$ $Q_i$, and $S_i$.

Once the look-up tables 20,22 are created, the following real-time algorithm produces the output of pulse shape filter, given a stream of payload bits $b_0$, $b_1$, . . . Algorithm:
Init: set the ($I_0$, $Q_0$)=(1, −1) (can be any other combination);
For i=0, 1, . . . ,
  1. calculate ($I_i$, $Q_i$) based on the differential modulation method (for example in look-up table 20);
  2. index the row of I table and Q table associated with ($S_i$), ($I_{i-1}$, $I_i$) and ($Q_{i-1}$, $Q_i$);
  3. send the numbers or samples at the row of I table and Q tables associated with the indices found in step (2) as the output of pulse shape filter.

Figure 3:
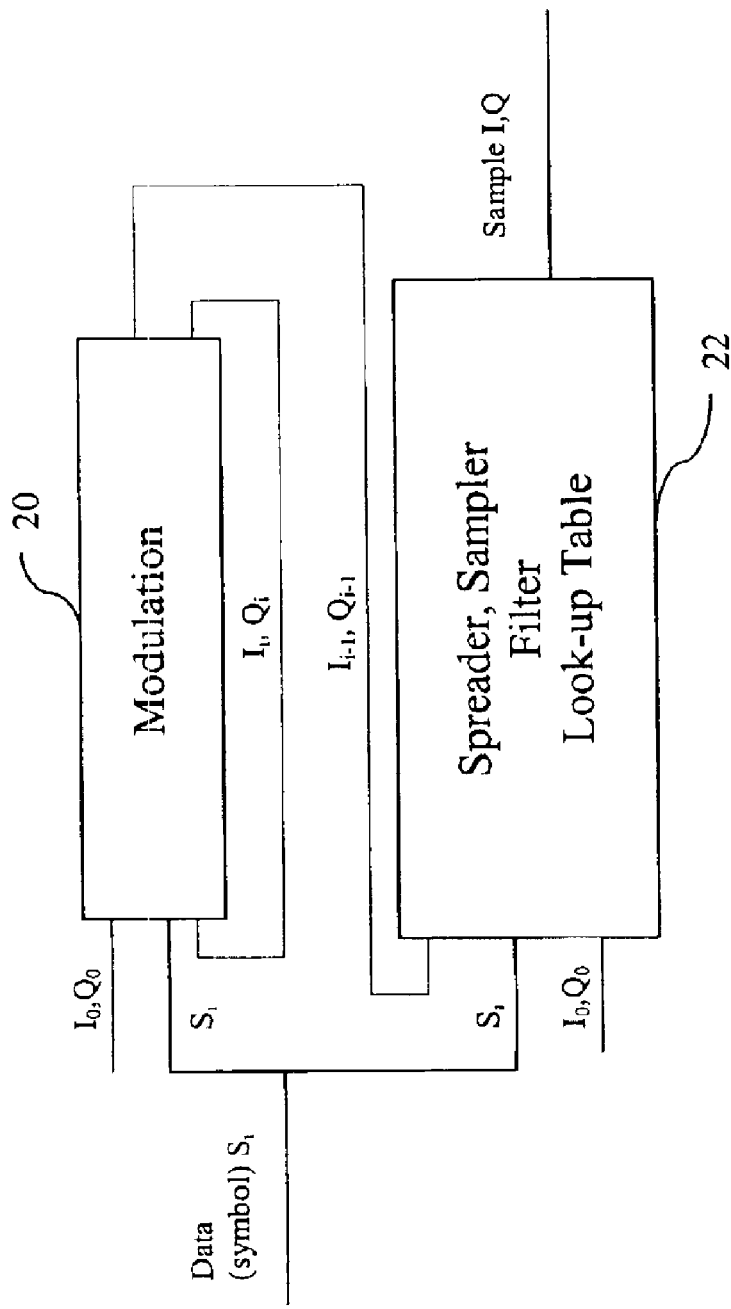
FIG. 3 is schematic of a portion of a transmitter according to the principles of the present invention for parallel processing.
Figure 4:
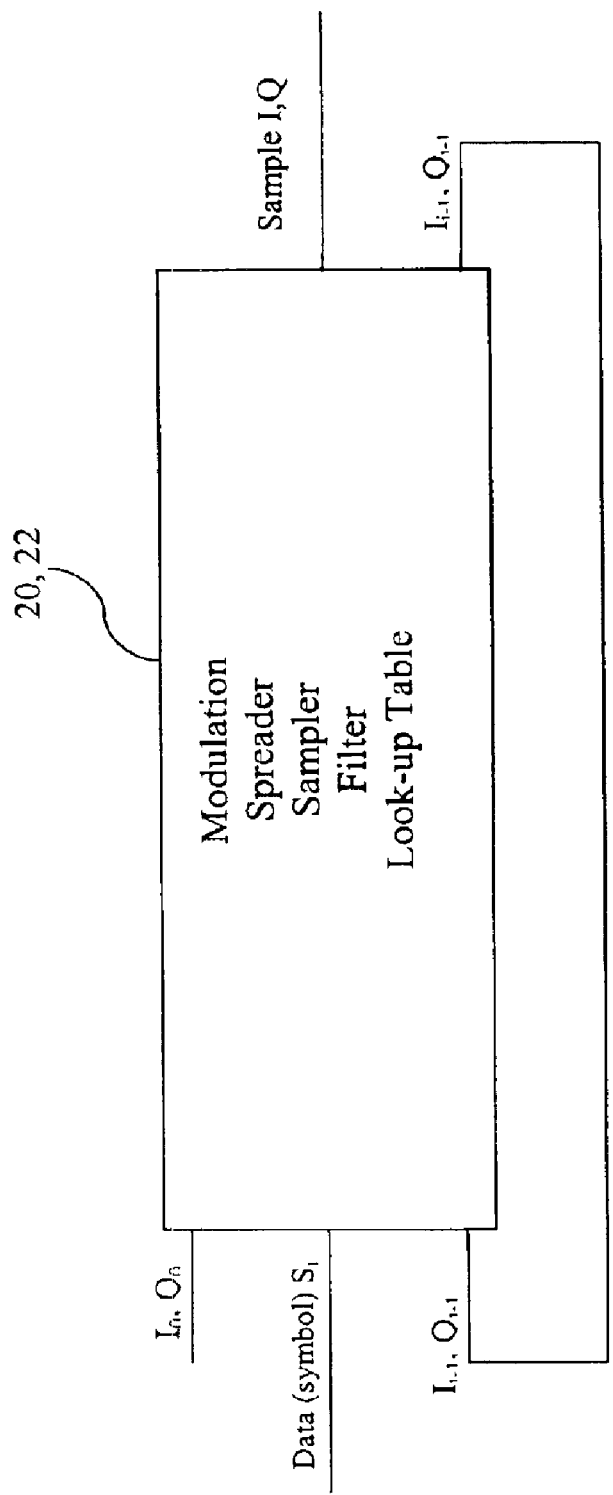
FIG. 4 is a schematic of a portion of a transmitter according to the principles of the present invention for simultaneous processing.

While FIG. 2 shows serial processing of the look-up tables 20 and 22, parallel as shown in FIG. 3 and simultaneous processing as show in FIG. 4 may be used. This would further increase the speed. The index for both look-up tables 20 and 22 in FIG. 3 would be $I_{i-1}$, $Q_{i-1}$ and $S_i$. Look-up table 20 provides the previous $I_{i-1}$ $Q_{i-1}$ as an input to look-up table 22, and the present $I_i$ $Q_i$ is fed back as the previous $I_{i-1}$ $Q_{i-1}$ for indexing the look-up table 20. In FIG. 4, the present $I_i$ $Q_i$ is stored in each row to form a single look-up table 20,22 with a single indexing using $I_{i-1}$ $Q_{i-1}$ and $S_i$. The present $I_i$ $Q_i$ is fed back as the previous $I_{i-1}$ $Q_{i-1}$ for indexing the look-up table.

As discussed with respect to FIG. 2, the look-up table 22 in FIGS. 3 and 4 may be a single table for I and Q or separate tables for I and Q. For FIG. 4, the modulation look-up would be a column in either or both look-up tables for I and Q.

As previously indicated, this increases the speed of processing. The use of a look-up table 20 for the modulation is described to further increase the speed, but other modulation methods may be used with the look-up table 22. Although a Barker code spreading is described, other spreading schemes or code may be used in the present invention.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed is:

1. A method of differential modulating, spreading, oversampling and filtering of a stream of data bits forming symbols for transmission, the method comprising:
  determining an in-phase component $I_i$ and a quadrature component $Q_i$ for each symbol $S_i$ using differential modulation with respect to an $I_{i-1}$ and a $Q_{i-1}$ of a previous symbol $S_{i-1}$ wherein i is an integer.
  indexing a row of an I matrix for the in-phase components using two of $I_{i-1}/Q_{i-1}$, $I_i/Q_i$, and $S_i$ and providing samples in the indexed row as a spread, over-sampled, filtered output of $I_i$; and indexing a row of a Q matrix for the quadrature components using two of $I_{i-1}/Q_{i-1}$, $I_i/Q_i$, and $S_i$ and providing samples in the indexed row as a spread, over-sampled, filtered output of $Q_i$.

2. The method according to claim 1, wherein each matrix has n rows, wherein n is equal to a number of possible combinations of values of said two of $I_{i-1}/Q_{i-1}$, $I_i/Q_i$, and $S_i$ and m columns, wherein m is equal to a spread factor times an over-sample factor.

3. The method according to claim 1, including, prior to performing the method, determining the spreading, over-sampling and filtering of the stream of data bits and storing the spread, over-sampled and filtered stream of data bits in the rows of each matrix.

4. The method according to claim 1, wherein the determining of $I_i$ and $Q_i$ uses a look-up table indexed by the previous $I_{i-1}$ $Q_{i-1}$ and the present symbol $S_i$.

5. The method according to claim 4, wherein the determining of $I_i$ and $Q_i$ is performed in one of in series with, in parallel with and simultaneously with indexing the I and Q matrices.

6. The method according to claim 4, wherein the look-up table is part of one of the I and Q matrices.

7. The method according to claim 1, wherein the determining of $I_i$ and $Q_i$ is performed in one of in series with, in parallel with and simultaneously with indexing the I and Q matrices.

8. The method according to claim 1, wherein the determining uses one of BPSK and QPSK differential modulation.

9. The method according to claim 1, including RF modulating and transmitting the output of the $I_i$ and $Q_i$.

10. The method according to claim 9, wherein the method is performed in a 802.11 protocol standard transmission.

11. A signal transmitter including means for performing the method of claim 1.

12. A method of transmitting a stream of data bits forming symbols comprising:

determining for each symbol $S_i$ an in-phase component $I_i$ and a quadrature component $Q_i$, wherein i is an integer;

indexing a matrix using two of a present symbol $S_i$, a present $I_i$, $Q_i$ pair and a previous $I_{i-1}$, $Q_{i-1}$ pair and providing a spread, over-sampled, filtered output sample of the $I_i$ and $Q_i$;

RF modulating the output sample of $I_i$ and $Q_i$; and transmitting the RF modulated $I_i$ and $Q_i$.

13. The method according to claim 12, wherein the matrix includes an I matrix and a Q matrix which are indexed using two of the present symbol Si, the present $I_i$, $Q_i$ pair and the previous $I_{i-1}$, $Q_{i-1}$ pair.

14. The method according to claim 12 wherein the determining $I_i$ and $Q_i$ uses differential modulation of the present symbol $S_i$ with respect to a previous symbol $S_{i-1}$.

15. The method according to claim 13, wherein each of the I and Q matrices has n rows, wherein n is equal to a number of possible combinations of values of two of the previous $I_{i-1}$, $Q_{i-1}$ pair, and the present $I_i$, $Q_i$ pair, and the present symbol $S_i$ and m columns, wherein m is equal to a spread factor times an over-sample factor.

16. The method according to claim 12, wherein the determining $I_i$ and $Q_i$ is performed in one of in series with, in parallel with and simultaneously with indexing the matrix.

17. A matrix device for processing a stream of data bits forming symbols $S_i$, each of which has been modulated into an in-phase component $I_i$ and a quadrature component $Q_i$ for transmission, the matrix device comprises an I matrix device and a Q matrix device, each I and Q matrix device comprising:

n rows, wherein n is equal to a possible combination of the values of two of a previous $I_{i-1}$, $Q_{i-1}$ pair, the present $I_i$, $Q_i$ pair, and the present symbol $S_i$, wherein i is an integer;

m columns, wherein m is equal to a spread factor times an over-sample factor; and each row including sample values corresponding to a spread, over-sampled, filtered $I_i$, $Q_i$.

18. The matrix device according to claim 17, wherein the modulated $I_i$, $Q_i$ are differential modulation of the present symbol Si with respect to a previous symbol $S_{i-1}$.

19. The matrix device according to claim 18, wherein values of the present $I_i$, $Q_i$ are included in each row as an additional column and wherein the rows are indexed by the previous $I_{i-1}$, $Q_{i-1}$ pair and the present symbol $S_i$.

* * * * *